Sept. 23, 1941. O. U. G. WILHELM 2,256,915
PRODUCT TREATING DEVICE
Filed Oct. 18, 1939 2 Sheets-Sheet 1
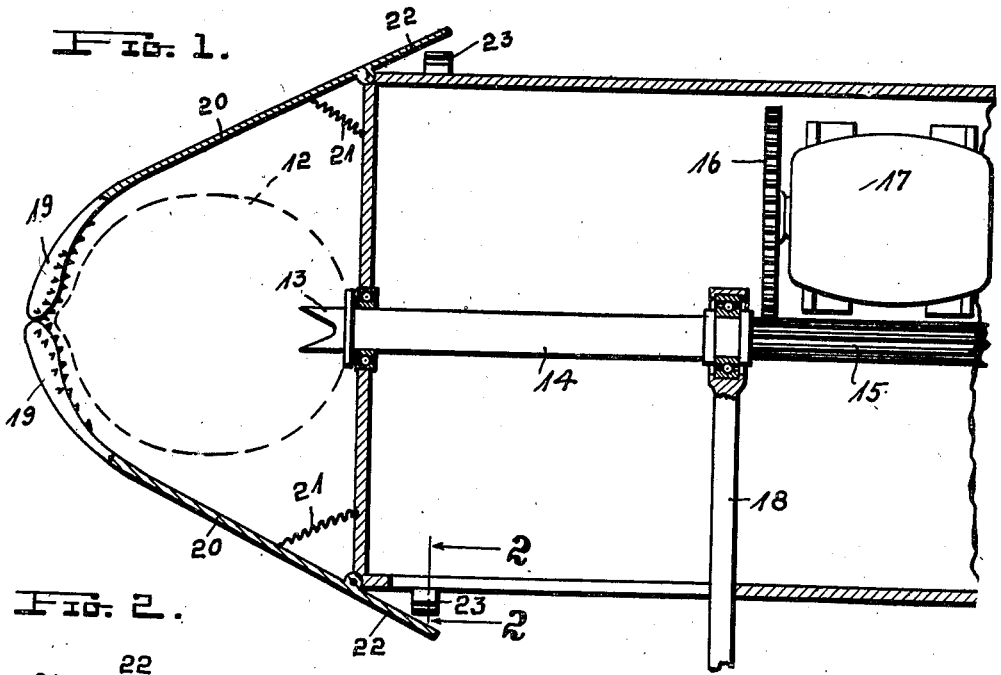
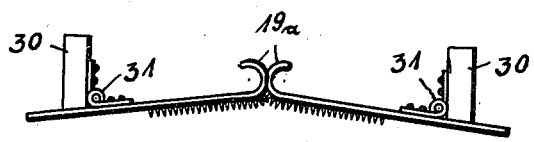
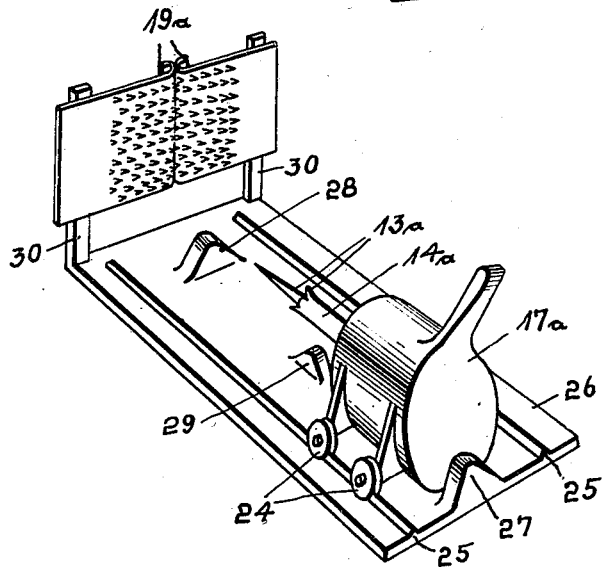
INVENTOR:
OTTO U. G. WILHELM,

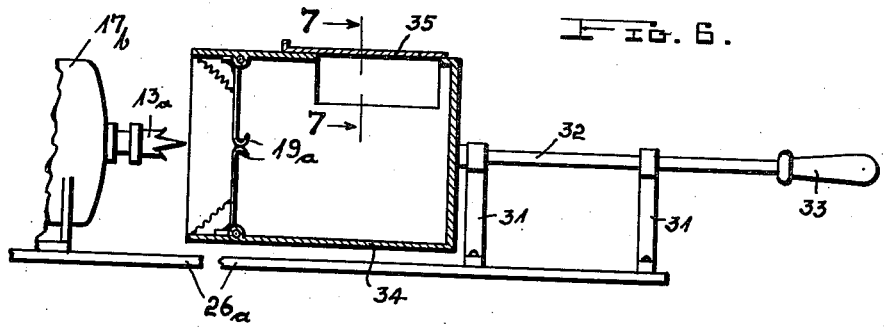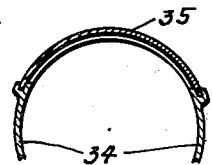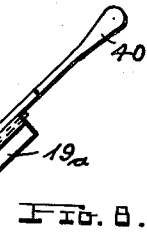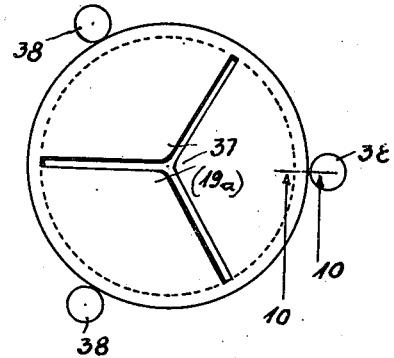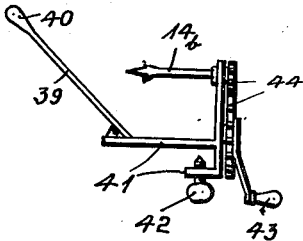

Patented Sept. 23, 1941

2,256,915

UNITED STATES PATENT OFFICE 2,256,915

PRODUCT TREATING DEVICE

Otto U. G. Wilhelm, Los Angeles, Calif.

Application October 18, 1939, Serial No. 299,959

2 Claims. (Cl. 146—177)

This invention relates to devices used for grating or cleaning the surface of fruit, vegetable, and the like.

One of the objects of this invention is to provide a device by which a grating or cleaning may be accomplished over the whole length, from end to end, of any inserted fruit, vegetable, or similarly suitable product.

Another object is to provide a device that will automatically adapt itself to different sizes of inserted objects.

Another object is to provide a device that will automatically eject the finished object.

Another object is to provide a device that can equally well be operated manually or by motor.

Other objects will appear from the following description and appended claims as well as from the accompanying drawings, in which—

Fig. 1 is a fragmentary horizontal mid-sectional view of a grater, showing the rough outline of a lemon in a position just before grating operation.

Fig. 2 is a fragmentary cross section through catching springs on line 2—2 of Fig. 1, showing the handle of a grater in inoperative position between the springs.

Fig. 3 is a top plan view of a slightly modified form of graters.

Fig. 4 is a top plan view of a controlling spring in detail for the grating device of Fig. 3.

Fig. 5 is a perspective view of a slightly modified form of grating device, particularly as to the mounting.

Fig. 6 is a side elevation, partly in vertical mid-section, of a slightly modified form of a device of the class described.

Fig. 7 is a fragmentary cross section on line 7—7 of Fig. 6.

Fig. 8 is a fragmentary side elevation of a slightly modified form of the grating or cleaning mechanism.

Fig. 9 is a schematic end elevation of a slightly modified form of grating and cleaning mechanism.

Fig. 10 is a fragmentary cross section on line 10—10 of Fig. 9.

Fig. 11 is a side elevation of another slightly modified form of device, for hand operation.

Whenever "grating" or "cleaning" is referred to in this application, it should be understood that this includes any operations, such as grating the whole skin from a lemon, or just cleaning the surface of a carrot, as it also may include a peeling of potato, apple and the like.

Making specific use of the word grating, this may more readily be explained with reference to the grating of a lemon.

It being well enough known that the skin of the lemon is very useful for flavoring purposes, several of the illustrations in the drawings may serve to explain just how a grating may be accomplished more evenly and quickly by means of this invention.

A lemon may readily be applied to the end 13 of the device as outlined at 12. This end 13 is a part of the shaft 14, mounted for rotary movements, in the form of Fig. 1 the rotating being accomplished by means of the fluted portion 15 of the shaft to act as a gear pinion with which the gear 16 on the motor 17 is meshed. The shaft may thus be shifted axially while the motor with its gear remain stationary and still maintaining the meshed condition, a handle 18 being shown by which the shaft may be actuated for such shifting operations.

Graters 19 are provided on swingably mounted arms 20 with which the lemon may be brought into contact by the referred to shifting operation of the shaft against the tension of the springs 21 so that the graters are always suitably pressed against the sides of the lemon regardless of the shape of the lemon.

Inasmuch as the fineness of the grating depends entirely on the requirements, no particular shape or size is illustrated, and it should be understood that different graters may be furnished with any such device that the user may have a chance to select a proper one for particular purposes.

As the shaft is moved, the lemon may reach a point beyond the graters so that the graters will close in behind the lemon, which condition may be used for removing the lemon from the end of the shaft by a reversing movement of the shaft.

The graters, by means of the arms, may be held in expanded position by having the handle-portions 22 pressed between the springs 23 while a new lemon is applied to the end of the shaft and while the shaft with the new lemon is returned to the starting position.

Instead of making the motor stationary and only the shaft shiftable, the motor with the shaft may be made shiftable as illustrated in the slightly modified form of Fig. 5, having the shaft 14a with its end 13a.

The motor 17a of this form is provided with wheels 24, which may be a part of a suitable carriage on which the motor could be mounted, though such wheels may eventually be applied to the base of any motor. The motor, so mounted, is then placed on the tracks 25 of the base 26 so that the motor may readily be shifted in definite directions, stops 27 and 28 being provided on the base to limit the shifting movements of the motor on the base in either direction, a further lug 29 being provided on the base by which any current-controlling switch on the motor may be actuated as the motor is moved back and forth over such a lug.

The graters 19a are mounted on the posts 30, which may be a part of one casting together with the base, or the posts may easily be made detachable.

Fig. 3 illustrates the graters 19a mounted hingedly at 31 on the posts 30; and Fig. 4 shows a spring 32 to co-operate with such hinges for controlling the graters by their arms, as previously described.

The slightly modified form of Fig. 6 provides for a shifting of the grater instead of the matter to be grated, or cleaned, or handled otherwise.

Mounting the motor 17b with its supporting end 13a on the base 26a so as to keep the motor stationary, while the base also supports brackets 31 for the shifting rod 32 with the handle 33, makes it possible to shift the grater towards the motor.

The grater in this form of modification is embodied in a holder of somewhat of a cylindrical holder 34, in which the shavings may be accumulated to be dumped out at a convenient moment, as may also be the object from which the shaving has been taken.

For cleaning the cylindrical drum 34, a special shiftable gate 35 is provided which may be held in any position desired, in the illustration appearing at the top, since the rod 32 may easily be held firmly in such a manner by the handle 33, Fig. 7 illustrating the arrangement of the gate 35 with respect to the drum 34.

While Fig. 1 illustrates a grater in which a product may be rotated with the stationary grating means attached to swingable arms, Fig. 9 shows a rotating head comprising a ring-like member 36 with segmental grating or finishing portions 37, which are preferably of pliable, flexible, or resilient material so that an object may pass through with the portions 37 pressing suitably on the object while passing in the manner set forth above.

Such a rotating head may be mounted in the manner illustrated in Figs. 9 and 10 between operating and idling rollers, which may be in form of gears or friction-rollers, it being sufficient if one of such rollers is a driving roller while the others are mere idlers.

Fig. 10 illustrates an edge view in cross section, but from this it should be understood that it should not materially affect the results whether the roller 38 is flanged or the ring member 36 as illustrated, the whole idea being to provide for end-thrust control against any pressure due to forcing an object through the members 37.

From the above, it should be understood that this invention involves a certain and particular type of contacting, which may be in form of grating, as with lemons, described above; or it may be mere cleaning or polishing, as with carrots, many people preferring to retain the skin of certain fruit or vegetables and merely brushing off the surface; or it may involve a peculiar manner of polishing, as with citrus fruit, since such fruit accumulates matter that makes it unattractive; or it may be peeling, as with apples.

For such reasons, the apparatus described here may be supplied with several attachments, each for a different purpose, as grating, cleaning, brushing, polishing, finishing, or peeling, it involving merely a matter of substitution for the part, or parts, 19 or 19a.

Brushes, or peelers are known in so many different forms that it should be unduly burdening this application if an attempt were to be made to show such well-known implements quite readily to be had on the open market, and it is to be understood that such or any other implements may be applied to the device as described and disclosed here, applicant claiming his apparatus as set forth.

Having thus described my invention, I claim:

1. In a device of the class described, a mechanism including means for securely holding and rotating a product of the class described, and a grating mechanism embodying tension means for yieldingly engaging the sides of the product so as to remove matter from the surface of the product under rotating and advancing movements between the mechanisms whereby the product is contacted from all sides and from one end substantially to the opposite and whereby the product is ejected by a movement opposite to said advancing movement as soon as the grating mechanism closes in behind the grated product.

2. In a device of the class described, a mechanism including means for securely holding a product of the class described, a grating mechanism embodying tension means for yieldingly engaging the sides of the product for grating purposes, means for rotating one mechanism with respect to the other mechanism, means for shifting one of the mechanisms axially with respect to the other, and means for contracting the yieldingly engaging means behind the product at its extreme point of advancing movement for ejecting the product on a reversing movement in said shifting.

OTTO U. G. WILHELM.